June 23, 1931.  T. G. LADSHAW  1,811,202
DRAIN DEVICE
Filed Dec. 6, 1928    2 Sheets-Sheet 1
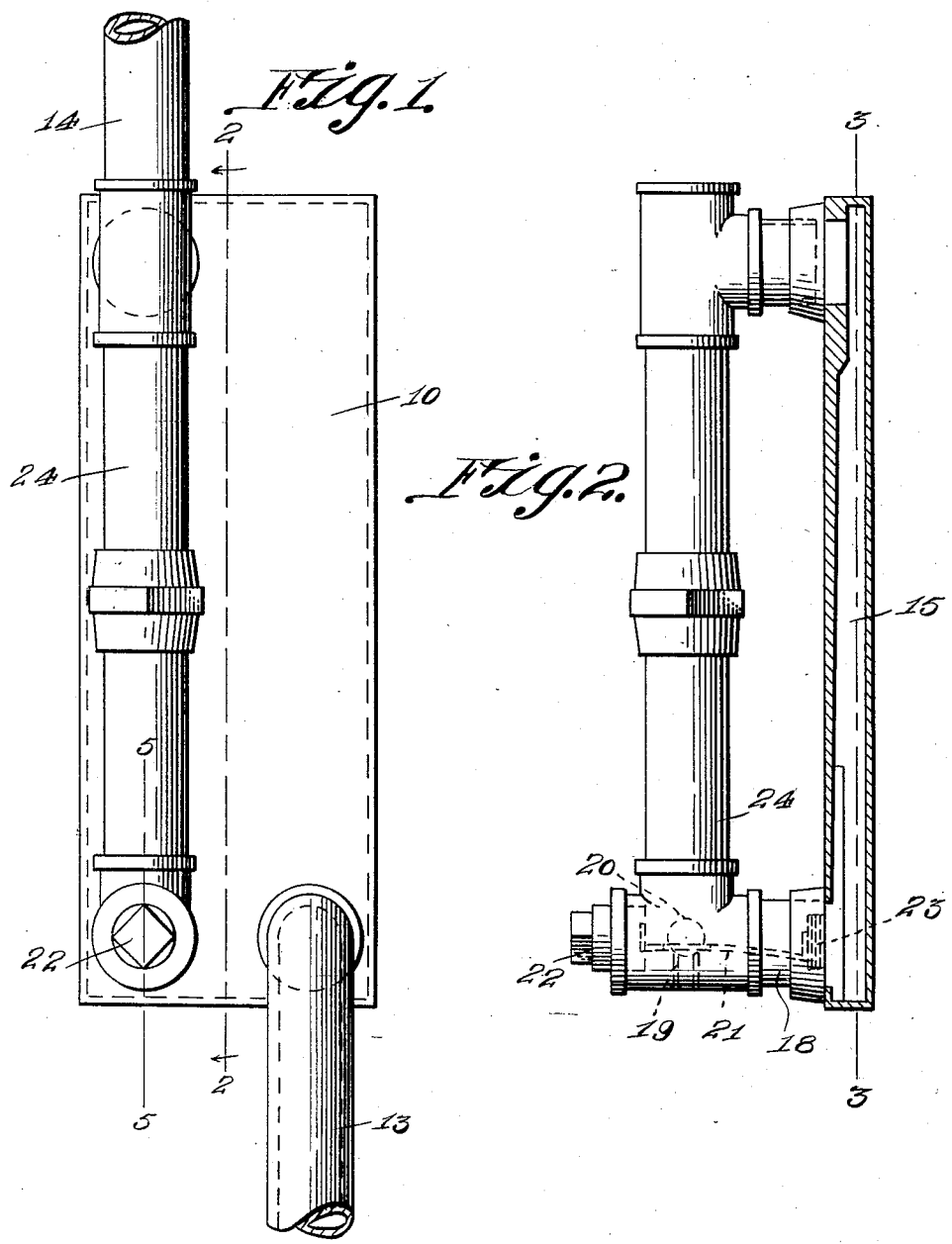
T. Gordon Ladshaw,
INVENTOR June 23, 1931. T. G. LADSHAW 1,811,202
DRAIN DEVICE
Filed Dec. 6, 1928 2 Sheets-Sheet 2
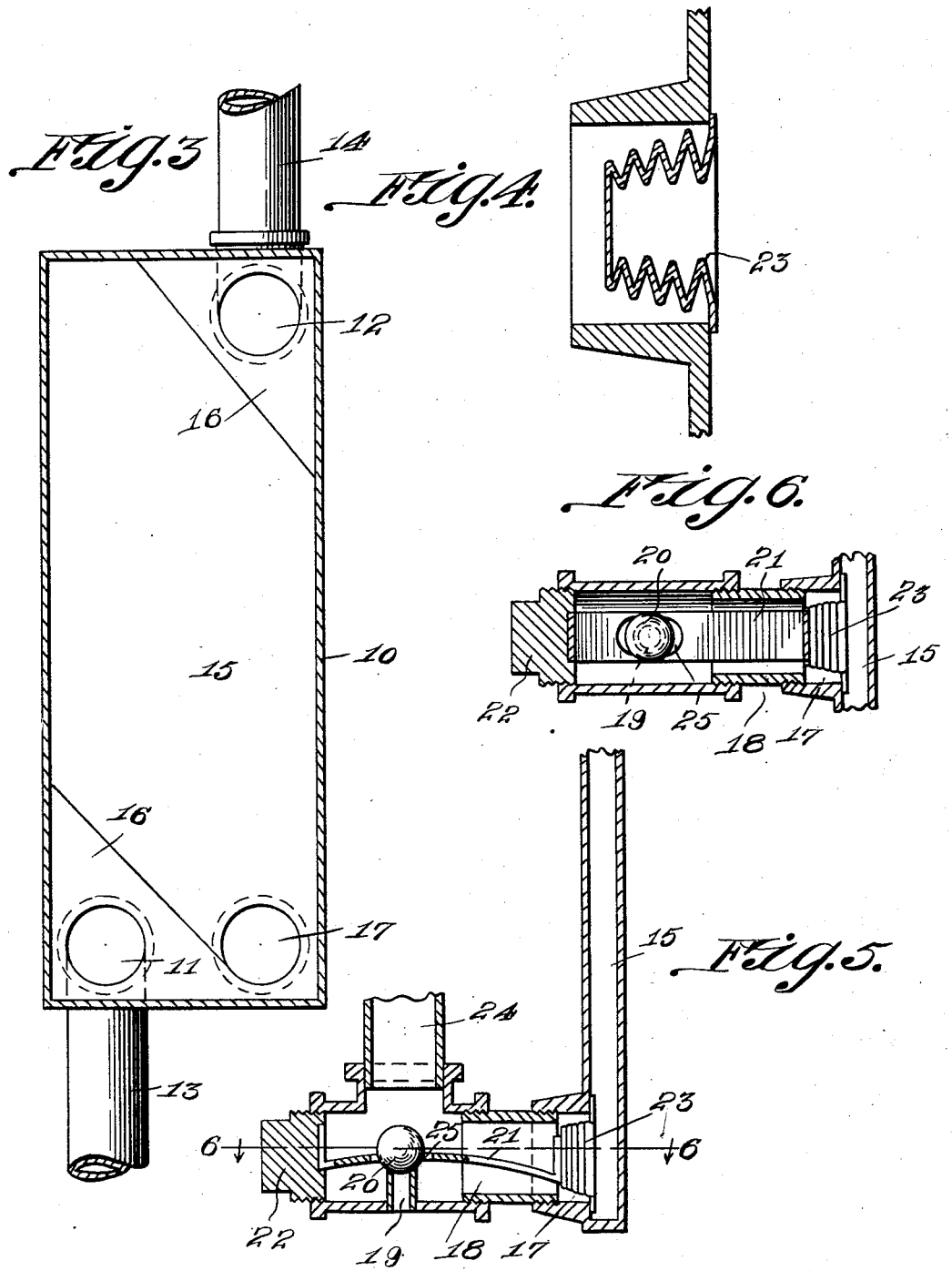

Patented June 23, 1931

1,811,202

UNITED STATES PATENT OFFICE

THOMAS GORDON LADSHAW, OF SPARTANBURG, SOUTH CAROLINA

DRAIN DEVICE

Application filed December 6, 1928. Serial No. 324,302.

This invention relates to means for preventing water pipes from freezing and has for an object the provision of a chamber which is adapted to be included in a water supply pipe and constructed so that water in said chamber will freeze prior to the water within the pipe and thus cut off flow of water through the pipe by the formation of ice.

Another object of the invention is the provision of means to automatically drain the pipe above the point of freezing when freezing occurs.

With the above and other objects in view, the invention further includes the following novel features and details of construction, to be hereinafter more fully described, illustrated in the accompanying drawings and pointed out in the appended claims.

In the drawings:—

Figure 1 is an elevation illustrating a fragmentary portion of a water pipe with the invention applied.

Figure 2 is a section on the line 2—2 of Figure 1.

Figure 3 is a section on the line 3—3 of Figure 2.

Figure 4 is an enlarged fragmentary section showing a portion of the casing of the water chamber with the valve spring in position.

Figure 5 is a sectional view on the line 5—5 of Figure 1.

Figure 6 is a section on the line 6—6 of Figure 5.

Referring to the drawings in detail wherein like characters of reference denote corresponding parts, the reference character 10 indicates a casing which may be made of some flexible metal and which is provided with an inlet port 11 and a discharge port 12. These ports are connected respectively to pipe sections 13 and 14, so that the chamber 15 which is formed by the casing, provides for continuous flow through the pipe sections. These pipe sections may form a portion of any water supply pipe and the section 13 which may extend into the ground may be suitably insulated to resist freezing.

By reference to Figure 2 of the drawings it will be seen that the casing 10 forms a thin water chamber so that the water within this chamber 15 will more readily freeze than the volume of water within the pipe sections 13 and 14 and when this freezing occurs, flow of water into the pipe section 14 will be interrupted.

It is preferred that freezing occur at the ports 11 and 12 before water within the remaining portion of the chamber 15 freezes and for this purpose, the walls of the chamber are thickened around the ports 11 and 12 as shown at 16 so that the body of water around these ports is even thinner than the body of water within the remaining portion of the chamber.

The invention further provides means for draining water from the pipe section above the chamber 15 or above the point of freezing and for this purpose the chamber 15 is provided with a port 17 which communicates with a pipe section 18 and this pipe section is provided with a drain 19. The drain 19 is controlled by a valve 20 and the latter is actuated by a spring arm 21 which has one of its ends engaged with a removable plug 22 while its opposite end engages an expansion element 23. This expansion element is positioned within the port 17 so that expansion within the chamber 15 due to freezing will actuate the expansion element 23 and lift the valve 20 so as to uncover the drain 19.

The pipe section 18 is in communication with the pipe section 14 through a pipe 24 so that water remaining within the pipe section 14 may flow outward through the drain 19.

The plug 22 is removable as shown and the valve 20 rests within a slot 25 provided in the arm 21 so that the parts may be readily taken apart for cleaning and repair.

In the operation of the invention, water within the thinnest portions of the chamber 15 around the ports 11 and 12 will be the first to freeze due to the fact that a thin sheet of water is provided at these points. Flow of water into the chamber 15 through the pipe 13 will thus be interrupted by the plug of ice formed at the port 11, while the flow into the chamber 15 from the pipe 14 will be prevented by the plug of ice formed at the port 12. Continued freezing will cause the water within the remaining portion of the chamber 15 to freeze and the expansion thus provided in this chamber will act upon the expansion element 23 to actuate the valve 20 and open the drain 19. Water will then flow from the pipe section 14 through the pipe connection 24 and outward through the drain, so that the pipe above the chamber will be drained.

The invention is susceptible of various changes in its form, proportions and minor details of construction and the right is herein reserved to make such changes as properly fall within the scope of the appended claims.

Having described the invention what is claimed is:

1. In combination with a water pipe, a relatively thin casing forming a section of said water pipe and providing a water chamber having a larger heat transmitting surface than the heat transmitting surface of the water pipe, the thinness of the casing and of the corresponding water column combined with the large heat transmitting surface serving to greatly decrease the time of freezing the water within said chamber from that in the water pipe, and means controlled by the freezing action of water to drain the pipe on the outlet side of the casing.

2. In combination with a water pipe, a relatively thin casing having inlet and outlet ports communicating with said pipe and defining a water chamber having a larger heat transmitting surface than the heat transmitting surface of the water pipe, thus causing the water in said chamber to freeze in a shorter time than the water contained within the pipe, and means whereby water in a portion of the water chamber will freeze prior to water within the remainder of said chamber, and means controlled by the freezing action of water to drain the pipe.

3. In combination with a water pipe, a relatively thin casing communicating with said water pipe and forming a water chamber having a larger heat transmitting surface than the heat transmitting surface of the water pipe, thus causing the water in said chamber to freeze prior to the water contained within the pipe, and means whereby water within said chamber at the points of communication with the pipe will freeze prior to water within the remaining portion of the chamber, thereby plugging or stopping the flow of water in said pipe and upon a rise of temperature sufficient to melt the ice in said chamber the device will automatically allow the flow of water to begin and means controlled by the freezing action of the water to drain the pipe.

4. In combination with a water pipe, a casing having inlet and discharge ports communicating with said pipe and defining a water chamber of less thickness than the diameter of the pipe, and means at the inlet and discharge ports to reduce the thickness of the water chamber at said ports, and means controlled by the action of water freezing within the chamber to drain the pipe.

5. In combination with a water pipe, a casing having inlet and discharge ports communicating with and forming a section of said pipe and defining a water chamber of less thickness than the diameter of the pipe, a normally closed valve controlled drain for the section of said pipe on the outlet side of said water chamber, and means controlled by expansion of the contents of the chamber to actuate the valve and open the drain.

6. In combination with a water pipe, a relatively thin casing forming a section of said pipe and defining a water chamber of less thickness than the diameter of the pipe, said chamber varying in thickness, whereby water therein will progressively freeze from one to the other end of said chamber, and means controlled by the freezing action of the water to drain the pipe.

7. In combination with a water pipe, a casing forming a section of said pipe and providing a water chamber having a larger heat transmitting surface than the heat transmitting surface of the water pipe, the casing being so formed that water in said chamber will freeze in a shorter time than water within an equal volume of the pipe, and means to cause the water within the chamber at the points of communication with the pipe to freeze in a shorter time than the water within the remaining portion of the chamber, and means actuated by the freezing water in said chamber to drain the pipe beyond the discharge end of said chamber.

In testimony whereof I affix my signature.

THOMAS GORDON LADSHAW.